(12) United States Patent
Moghanloo et al.

(10) Patent No.: US 12,196,072 B2
(45) Date of Patent: Jan. 14, 2025

(54) DETERMINING ASPHALTENE DEPOSITION IN A FLOWLINE

(71) Applicant: The Board of Regents of the University of Oklahoma, Norman, OK (US)

(72) Inventors: Rouzbeh Ghanbar Moghanloo, Edmond, OK (US); Minhui Qi, Norman, OK (US); Xin Su, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 480 days.

(21) Appl. No.: 17/569,332

(22) Filed: Jan. 5, 2022

(65) Prior Publication Data

US 2022/0213780 A1 Jul. 7, 2022

Related U.S. Application Data

(60) Provisional application No. 63/134,016, filed on Jan. 5, 2021.

(51) Int. Cl.
*E21B 37/06* (2006.01)
*C09K 8/524* (2006.01)
*E21B 47/00* (2012.01)

(52) U.S. Cl.
CPC ............ *E21B 47/006* (2020.05); *C09K 8/524* (2013.01); *E21B 37/06* (2013.01); *E21B 2200/20* (2020.05)

(58) Field of Classification Search
CPC .......... E21B 37/06; E21B 43/14; E21B 43/12; E21B 43/00; E21B 47/006; E21B 2200/20; C09K 8/524
See application file for complete search history.

(56) References Cited

U.S. PATENT DOCUMENTS

| | | | |
|---|---|---|---|
| 11,320,363 B2* | 5/2022 | Bennett | G06Q 10/06395 |
| 2007/0289740 A1* | 12/2007 | Thigpen | E21B 43/12 166/250.01 |

(Continued)

OTHER PUBLICATIONS

Alhosani et al; "Modeling of asphaltene deposition during oil/gas flow in wellbore"; Date: Jul. 13, 2020; URL: https://www.sciencedirect.com/science/article/pii/S0016236120316136 (Year: 2020).*

(Continued)

*Primary Examiner* — Edwin J Toledo-Duran
(74) *Attorney, Agent, or Firm* — Conley Rose, P.C.

(57) ABSTRACT

A method of performing a remediation process on a flowline comprises: calculating an asphaltene deposition profile characterizing blockage of the flowline by a deposit of asphaltene; determining, based on the asphaltene deposition profile, whether the blockage exceeds a predetermined level of blockage; and treating the flowline with an asphaltene solvent to dissolve at least a portion of the deposit when the blockage exceeds the predetermined level. A computer program product comprises instructions that are stored on a computer-readable medium and that, when executed by a processor, cause an apparatus to: calculate an asphaltene deposition profile characterizing blockage of a flowline by a deposit of asphaltene; determine, based on the asphaltene deposition profile, whether the blockage exceeds a predetermined level of blockage; and determine to treat the flowline with an asphaltene solvent to dissolve at least a portion of the deposit when the blockage exceeds the predetermined level.

20 Claims, 15 Drawing Sheets

(56) References Cited

U.S. PATENT DOCUMENTS

| | | | | |
|---|---|---|---|---|
| 2008/0262737 | A1* | 10/2008 | Thigpen | G01V 1/40 |
| | | | | 702/9 |
| 2013/0009049 | A1* | 1/2013 | Smaardyk | G01V 5/125 |
| | | | | 250/269.1 |

OTHER PUBLICATIONS

Agarwal, Jugal Kishore; "Aerosol Sampling and Transport"; University of Minnesota; Jun. 1975; 193 pages.

Alhosani, Ahmed, et al.; "Unified Model to Predict Asphaltene Deposition in Production Pipelines"; Energy & Fuels; vol. 34; Jan. 28, 2020; 8 pages.

Beal, S. K.; "Deposition of Particles in Turbulent Flow on Channel or Pipe Walls"; Nuclear Science and Engineering; vol. 40; 1970; 11 pages.

Beal, S. K.; "Deposition of Polydisperse Aerosols in Turbulent Flow"; Atmospheric Environment; vol. 4; 1970; 3 pages.

Chapman, Walter G., et al.; "Phase Equilibria of Associating Fluids, Chain Molecules with Multiple Bonding Sites"; Molecular Physics; vol. 65, No. 5; 1988; 24 pages.

Chapman, W. G., et al.; "SAFT: Equation-of-State Solution Model for Associating Fluids"; Fluid Phase Equilibria; vol. 52; 1989; 8 pages.

Chen, Wen et al.; "Simulation of Particle Size Distribution in an Aggregation-Breakup Process"; Chemical Engineering Science; vol. 45, No. 9; 1990; 4 pages.

Davudov, Davud, et al.; "A Systematic Comparison of Various Upgrading Techniques for Heavy Oil"; Journal of Petroleum Science and Engineering; vol. 156; 2017; 10 pages.

Davudov, Davud, et al.; "Scaling Analysis and Its Implication for Asphaltene Deposition in a Wellbore"; SPE Journal; Apr. 2018; 12 pages.

De Boer, R. B., et al.; "Screening of Crude Oils for Asphalt Precipitation: Theory, Practice, and the Selection of Inhibitors"; SPE Production & Facilities; Feb. 1995; 7 pages.

Elimelech, M., et al.; "Particle Deposition and Aggregation Measurement, Modelling and Simulation"; Butterworth-Heinemann; 1995; 6 pages.

El-Shoboksy, M. S., et al.; "Deposition of Aerosol Particles from Turbulent Flow onto Rough Pipe Wall"; Atmospheric Environment; vol. 14; 1980; 8 pages.

Escobedo, Joel, et al.; "Asphaltene and Other Heavy-Organic Particle Deposition During Transfer and Production Operations"; SPE Annual Technical Conference and Exhibition; Dallas, Texas; Oct. 22-25, 1995; SPE 30672; 16 pages.

Eskin, D., et al.; "Modelling Asphaltene Deposition In Turbulent Pipeline Flows"; The Canadian Journal of Chemical Engineering; vol. 89; Jun. 2011; 21 pages.

Fan, Fa-Gung, et al.; "A Sublayer Model for Turbulent Deposition of Particles in Vertical Ducts with Smooth and Rough Surfaces"; J. Aerosol Sci.; vol. 24, No. 1; 1993; 20 pages.

Flory, Paul J.; "Constitution of Three-Dimensional Polymers and the Theory of Gelation"; J. Phsy. Chem.; vol. 46; Jan. 1, 1942; 9 pages.

Friedlander, Sheldon Kay; "Deposition of Aerosol Particles from Turbulent Gases"; University of Illinois; Jul. 15, 1954; 84 pages.

Friedlander, S. K., et al.; "Deposition of Suspended Particles from Turbulent Gas Streams"; Ind. Eng. Chem.; vol. 49, No. 7; Jul. 1957; 6 pages.

Gross, Joachim, et al.; "Perturbed-Chain SAFT: An Equation of State Based on a Perturbation Theory for Chain Molecules"; Ind. Eng. Chem. Res.; vol. 40; Jan. 18, 2001; 17 pages.

Guichard, Romain, et al.; Simulation of Nanoparticle Coagulation Under Brownian Motion and Turbulence in a Differential-Algebraic Framework: Developments and Applications; International Journal of Multiphase Flow; vol. 64; 2014; 12 pages.

Hasanvand, Mahdi Zeinali, et al.; "The Effect of Asphaltene Particle Size and Distribution on the Temporal Advancement of the Asphaltene Deposition Profile in the Well Column"; The European Physical Journal Plus; vol. 131, No. 150; May 16, 2016; 12 pages.

Huggins, Maurice L.; "Solutions of Long Chain Compounds"; Journal of Chemical Physics; vol. 9; May 1941; 1 page.

Jamialahmadi, M., et al.; "Measurement and Prediction of the Rate of Deposition of Flocculated Asphaltene Particles from Oil"; International Journal of Heat and Mass Transfer; vol. 52; 2009; 11 pages.

Johnson, Philip R., et al.; "Dynamics of Colloid Deposition in Porous Media: Blocking Based on Random Sequential Adsorption"; Langmuir, vol. 11, No. 3; 1995; 12 pages.

Kapur, P. C.; "Self-Preserving Size Spectra of Comminuted Particles"; Chemical Engineering Science; vol. 27; 1972; 7 pages.

Khanifar, Ahmad, et al.; "The Effects of Asphaltene Precipitation and Deposition Control Parameters on Reservoir Performance: A Numerical Approach"; SPE Reservoir Characterization and Simulation Conference and Exhibition; Abu Dhabi, UAE; Oct. 9-11, 2011; SPE 146188; 10 pages.

Kim, Chong S., et al.; "Deposition of Aerosol Particles in a Straight Tube with an Abrupt Obstruction"; J. Aerosol Sci.; vol. 15, No. 2; 1984; 10 pages.

Kurup, Anjushri S., et al.; "Development and Application of an Asphaltene Deposition Tool (ADEPT) for Well Bores"; Energy & Fuels; vol. 25; Sep. 20, 2011; 11 pages.

Lei, Hao, et al.; "Experimental Investigation and Application of the Asphaltene Precipitation Envelope"; Energy & Fuels; vol. 29; Oct. 9, 2015; 8 pages.

Leontaritis, K. J., et al.; "Asphaltene Flocculation During Oil Production and Processing: A Thermodynamic Colloidal Model"; SPE International Symposium on Oilfield Chemistry; San Antonio, Texas; Feb. 4-6, 1987; SPE 16258; 10 pages.

Lin, C. S., et al.; "Mass Transfer between Solid Wall and Fluid Streams"; Industrial and Engineering Chemistry; Mar. 1953; 5 pages.

Liu, Benjamin Y. H., et al.; "Experimental Observation of Aerosol Deposition in Turbulent Flow"; Aerosol Science; vol. 5; 1974; 13 pages.

Maqbool, Tabish, et al.; "Modeling the Aggregation of Asphaltene Nanoaggregates in Crude Oil-Precipitant Systems"; Energy & Fuels; vol. 25; Mar. 7, 2011; 12 pages.

Maqbool, Tabish, et al.; "Revisiting Asphaltene Precipitation from Crude Oils: A Case of Neglected Kinetic Effects"; Energy & Fuels; vol. 23; Jun. 12, 2009; 6 pages.

Mofakham, Amir A., et al.; "Particles Dispersion and Deposition in Inhomogeneous Turbulent Flows Using Continuous Random Walk Models"; Phys. Fluids; vol. 31; Aug. 12, 2019; 14 pages.

Pan, Huanquan, et al.; "Thermodynamic Micellization Model for Asphaltene Precipitation Inhibition"; AIChE Journal; vol. 46, No. 2; Feb. 2000; 11 pages.

Papavergos, P. G., et al.; "Particle Deposition Behaviour from Turbulent Flows"; Chem. Eng. Res. Des.; vol. 62; Sep. 1984; 21 pages.

Peng, Ding-Yu, et al.; "A New Two-Constant Equation of State"; Ind. Eng. Chem. Foundam.; vol. 15, No. 1; 1976; 6 pages.

Rahmani, Nazmul H. G., et al.; "Characterization of Asphaltenes Aggregation and Fragmentation in a Shear Field"; AIChE Journal; vol. 49, No. 7; Jul. 2003; 11 pages.

Ramirez-Jaramillo, E., et al.; "Modeling Asphaltene Deposition in Production Pipelines"; Energy & Fuels; vol. 20; Mar. 10, 2006; 13 pages.

Scott, Robert L., et al.; "The Thermodynamics of High-Polymer Solutions: I. The Free Energy of Mixing of Solvents and Polymers of Heterogeneous Distribution"; The Journal of Chemical Physics; vol. 13, No. 5; May 1945; 7 pages.

Soave, Giorgio; "Equilibrium Constants from a Modified Redlich-Kwong Equation of State"; Chemical Engineering Science; vol. 27; 1972; 7 pages.

Tandon, Pushkar, et al.; "Paricle Deposition from Turbulent Flow in a Pipe"; J. Aerosol Sci.; vol. 29, No. 1/2; 1998; 16 pages.

Victorov, Alexey I., et al.; "Thermodynamic Micellization Model of Asphaltene Precipitation from Petroleum Fluids"; AIChE Journal; vol. 42, No. 6; Jun. 1996; 12 pages.

(56) References Cited

OTHER PUBLICATIONS

Vilas Boas Favero, Claudio, et al.; "Mechanistic Investigation of Asphaltene Deposition"; Energy & Fuels; vol. 30; Sep. 19, 2016; 7 pages.
Wang, J. X., et al.; "A Two-Component Solubility Model of the Onset of Asphaltene Flocculation in Crude Oils"; Energy & Fuels; vol. 15; Jun. 5, 2001; 9 pages.
Wang, Jianxin, et al.; "Asphaltene Stability in Crude Oil and Aromatic Solvents—The Influence of Oil Composition"; Energy & Fuels; vol. 17; Sep. 6, 2003; 7 pages.
Wang, J. X., et al.; "Screening for Potential Asphaltene Problems"; SPE Annual Technical Conference and Exhibition; San Antonio, Texas, U.S.A.; Sep. 24-27, 2006; SPE 103137; 6 pages.
Wells, A. C., et al.; "Transport of Small Particles to Vertical Surfaces"; Brit. J. Appl. Phys.; vol. 18; 1967; 8 pages.
Zanganeh, Peyman, et al.; "Asphaltene Deposition during CO2 Injection and Pressure Depletion: A Visual Study"; Energy & Fuels; vol. 26; Dec. 15, 2011; 8 pages.
Zhao, Yingxian, et al.; "Kinetics and Selectivity of Asphaltene Hydrocracking"; Fuel; vol. 90; 2011; 7 pages.

\* cited by examiner

FIG. 5

DETERMINING ASPHALTENE DEPOSITION IN A FLOWLINE

CROSS-REFERENCE TO RELATED APPLICATIONS

This claims priority to U.S. Prov. Patent App. No. 63/134,016 filed on Jan. 5, 2021, which is incorporated by reference.

BACKGROUND

Asphaltenes are branched hydrocarbons that contain aromatic and cycloalkane rings and are found to some extent in all types of petroleum and heavy oils. Oil-based materials are classified as asphaltenes if they are soluble (i.e., dissolve) in toluene and are insoluble (i.e., precipitate) in n-alkane solvents such as n-pentane or n-heptane at standard temperature and pressure. As oil flows through a flowline such as a wellbore, pipeline, production line, or other conduit through which a petroleum may flow, aggregates of asphaltenes accumulate on the inner walls of the flowline, thereby constricting the diameter of the opening and causing a reduction in the efficiency of the flow therein. Flowlines must be treated periodically with solvents to dissolve the buildup of asphaltene to improve the flow of oil therethrough. This process, known as remediation, can be a costly, time-consuming, and environmentally-damaging procedure. It is therefore desirable to reduce the frequency and extent of asphaltene remediation. It is to this goal that the present disclosure is directed.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 is a GUI for selecting one of three asphaltene precipitation calculation models.

DETAILED DESCRIPTION

Figure 1:
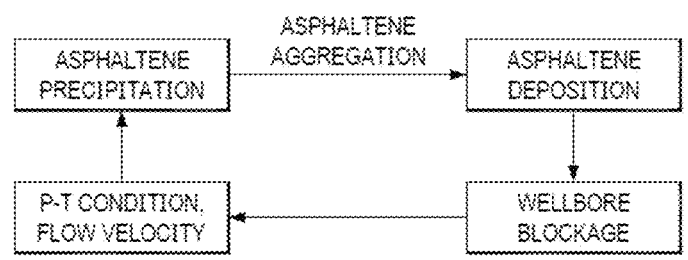
FIG. 1 is a calculation flowchart of the presently disclosed model of asphaltene aggregation.

The present disclosure is directed to methods of determining asphaltene deposition in oil flowlines for improving the efficiency of asphaltene remediation, thereby reducing the various costs associated with asphaltene remediation. An integrated simulation approach is used to predict the asphaltene deposition profile along the flowline by integrating asphaltene precipitation, aggregation, and deposition models. With sufficient field and/or experimental data set, the time-dependent flowline asphaltene deposition profile can be obtained, enabling improved choke management to mitigate blockage of the flowline by asphaltene. For example, by accurately estimating or predicting a wellbore blockage status, the frequency of required chemical treatment of the wellbore can be significantly reduced, thereby reducing operational costs, as well as extending the production life of the wellbore, which is of great importance in making a well cost-effective over time.

Unlike currently used methods, the presently disclosed simulation approach integrates both an asphaltene aggregation mechanism and a thermodynamic model describing the asphaltene precipitation. By integrating asphaltene precipitation, aggregation, and deposition models, the disclosed algorithm can model the entire fate of asphaltene particles from when they separate from the crude oil, to their flocculation, thence to deposition of asphaltene aggregates in a flowline; thus, coupling among hydrodynamic, molecular dynamics, and thermodynamics is realized. The process of remediation of the flowline is made more efficient, thereby improving the economics of the wellsite or production operation. Where used herein, the term "flowline" refers to wellbores, production lines, pipelines, or any conduit through which petroleum or heavy oil flows through, and which is subject to constriction by asphaltene deposition, unless otherwise specified.

Before describing various embodiments of the present disclosure in more detail by way of exemplary description, examples, and results, it is to be understood as noted above that the present disclosure is not limited in application to the details of methods and apparatus as set forth in the following description. The present disclosure is capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the embodiments of the present disclosure may be practiced without these specific details. In other instances, features which are well known to persons of ordinary skill in the art have not been described in detail to avoid unnecessary complication of the description.

Unless otherwise defined herein, scientific and technical terms used in connection with the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications (e.g., articles) referenced in any portion of this application are herein expressly incorporated by reference in their entirety to the same extent as if each individual patent or publication was specifically and individually indicated to be incorporated by reference.

As utilized in accordance with the methods and apparatus of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, of 1-10, 10-20, 20-30, 30-40, 40-50, 50-60, 60-75, 75-100, 100-150, 150-200, 200-250, 250-300, 300-400, 400-500, 500-750, 750-1,000, includes ranges of 1-20, 10-50, 50-100, 100-500, and 500-1,000, for example.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the terms "about" or "approximately" are used to indicate that a value includes the inherent variation of error. Further, in this detailed description, each numerical value (e.g., temperature or time) should be read once as modified by the term "about" or "approximately" (unless already expressly so modified), and then read again as not so modified unless otherwise indicated in context. As noted, any range or consecutive set of numbers listed or described herein is intended to include, implicitly or explicitly, any number within the range or set of numbers, including fractions and whole numbers, including the end points, and is to be considered as having been so stated. For example, "a range from 1 to 10" is to be read as indicating each possible number, particularly integers and fractions, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range. The use of the term "about" or "approximately" may mean a range including ±10% of the subsequent number unless otherwise stated.

As used herein, the term "substantially" means that the subsequently described parameter, function, event, or circumstance completely occurs or that the subsequently described parameter, function, event, or circumstance occurs to a great extent or degree. For example, the term "substantially" means that the subsequently described parameter, function, event, or circumstance occurs at least 75% of the time, at least 80% of the time, at least 85% of the time, at least 90% of the time, at least 91% of the time, or at least 92% of the time, or at least 93% of the time, or at least 94% of the time, or at least 95% of the time, or at least 96% of the time, or at least 97% of the time, or at least 98% of the time, or at least 99% of the time, or means that the dimension or measurement is within at least 75%, or at least 80%, or at least 85%, or at least 90%, or at least 91%, or at least 92%, or at least 93%, or at least 94%, or at least 95%, or at least 96%, or at least 97%, or at least 98%, or at least 99%, of the referenced dimension, function, parameter, or measurement (e.g., length).

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Features of any of the embodiments disclosed herein may be combined with features of any of the other embodiments disclosed herein to create a new embodiment.

Where used herein the term "predetermined level of blockage" of a flowline by an asphaltene deposit may be selected from at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70%, at least 71%, at least 72%, at least 73%, at least 74%, at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% blockage of the bore of a flowline as taken through a cross-section of the flowline.

The following abbreviations apply:
APE: asphaltene precipitation envelope
ASIC: application-specific integrated circuit
CPU: central processing unit
CRW: continuous random walk
DSP: digital signal processor
EO: electrical-to-optical
FPGA: field-programmable gate array
GUI: graphical user interface
MDS: molecular dynamics simulation
MPa: megapascal(s)
OE: optical-to-electrical
PSD: particle size distribution
RAM: random-access memory
RF: radio frequency
ROM: read-only memory
RX: receiver unit
SRAM: static RAM
TCAM: ternary content-addressable memory
TX: transmitter unit.
wt: weight
μm: micrometer(s)
° C.: degree(s) Celsius.

Process Overview

FIG. 1 is a calculation flowchart of the presently disclosed model of asphaltene aggregation. At step 1, user uploaded modelling parameters, such as the asphaltene particle size distribution, wellbore mesh, wellbore velocity distribution profile, wellbore pressure and temperature distribution, asphaltene precipitation envelope, and bubble point pressure, are read. At step 2, the asphaltene precipitation model is calculated or the user-defined data are read to determine the weight percentage of precipitated asphaltene particles in the mixture. At step 3, by utilizing the given PSD data, the asphaltene aggregation model is calculated and the PSD data are renewed after each timestep. At step 4, the asphaltene deposition rate is calculated using the model selected by the user. At step 5, the wellbore flow dataset is renewed by considering the blockage profile and calculate the next timestep.

Module Descriptions

Figure 2:
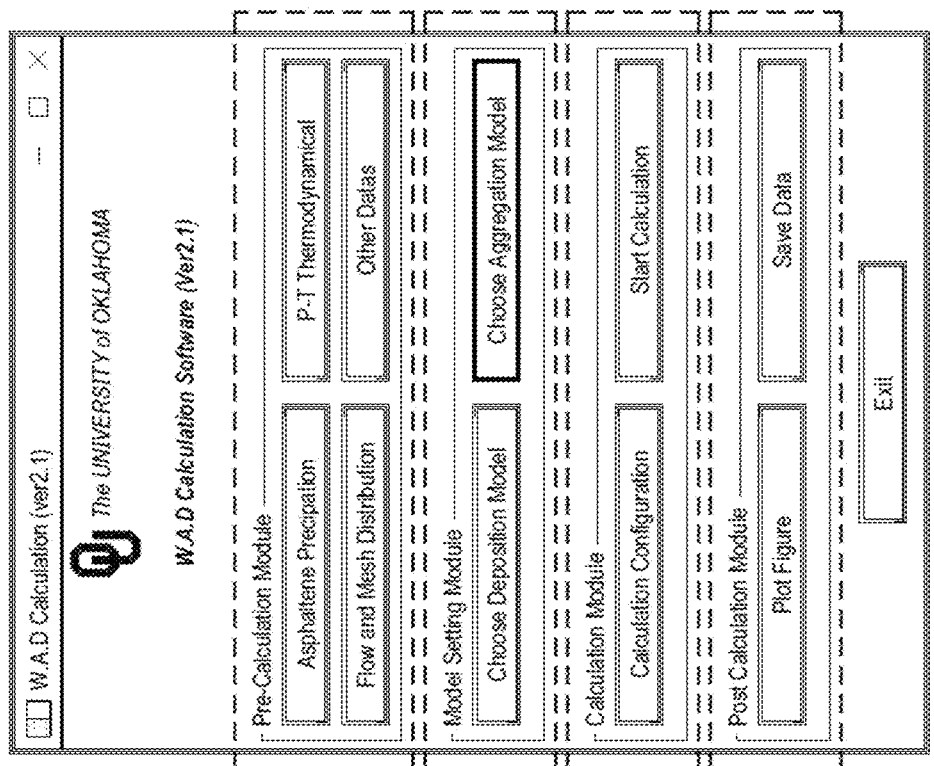
FIG. 2 is a diagram of a GUI with four modules, pre-calculation, model setting, calculation, and post-processing, used in the present system.

FIG. 2 is a diagram of a GUI with four modules, pre-calculation, model setting, calculation, and post-processing, used in the present system. The pre-calculation module uploads modelling parameters and calculates the weight percentage of the precipitated asphaltene particles in the oil. The model setting module lets the user define the parameters and model used for the calculation of asphaltene deposition and aggregation. In the calculation module, the user can set up the timestep and termination condition of the calculation. The simulation results can be observed and saved using the post-processing module. The modules and their sub-windows are further described below.

1. Pre-Calculation Module

Asphaltene Precipitation Sub-Window

Figure 3:
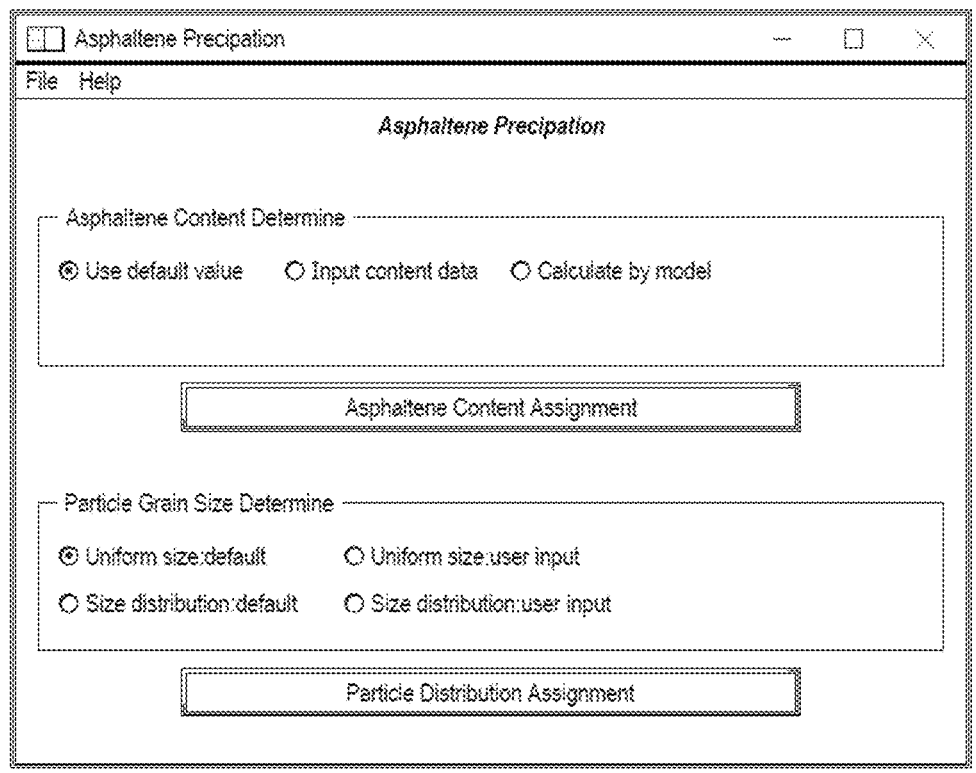
FIG. 3 is a diagram of a GUI for specifying the asphaltene precipitation related modelling data.

FIG. 3 is a diagram of a GUI for specifying the asphaltene precipitation related modelling data. The weight percentage and size distribution of the asphaltene particles in the mixture should be specified in this sub-window before calculation.

Input Asphaltene Content Sub-Window

Figure 4:
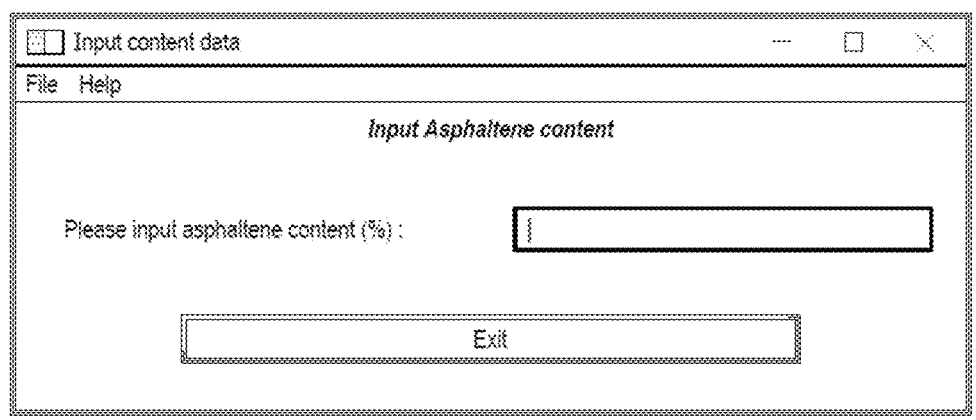
FIG. 4 is a GUI for inputting asphaltene particle content.

FIG. 4 is a GUI for inputting asphaltene particle content. The system offers three ways to determine the asphaltene particle content: "Use default value," "Input content data," and "Calculate by model." The user may select one of these options in the combo box and click the "Asphaltene Content Assignment" button. The default asphaltene weight percentage value is 0.001%. By choosing the "Use default value" option in the combo box and clicking the "Asphaltene Content Assignment" button, the default value is assigned. By choosing the "Input content data" option, the user can input the weight percentage data in a new sub-window shown in FIG. 4.

Input Parameters for Model Calculation Sub-Window

Figure 5:
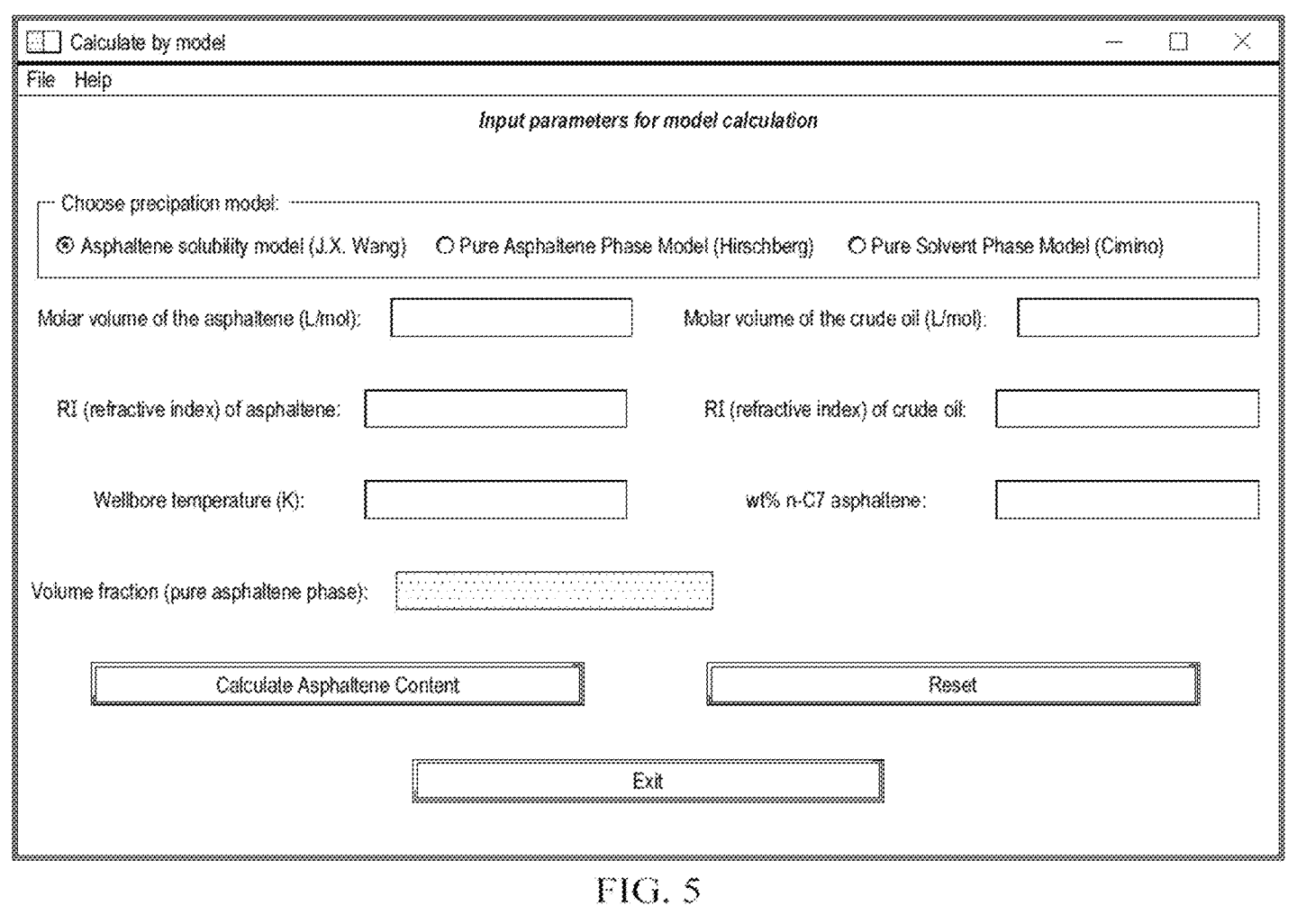

FIG. 5 is a GUI for selecting one of three asphaltene precipitation calculation models. Instead of giving the static weight percentage data, the GUI has three asphaltene precipitation calculation models that can be chosen to calculate asphaltene content: the asphaltene solubility model, the pure asphaltene phase model, and the pure solvent phase model. After choosing the model, the user may input all the required modeling parameters. The three asphaltene precipitation models are described in J. X. Wang, et al., "A Two-Component Solubility Model of the Onset of Asphaltene Flocculation in Crude Oils," Energy & Fuels, 2001, which is incorporated by reference.

Input Particle Radius Sub-Window

Figure 6:
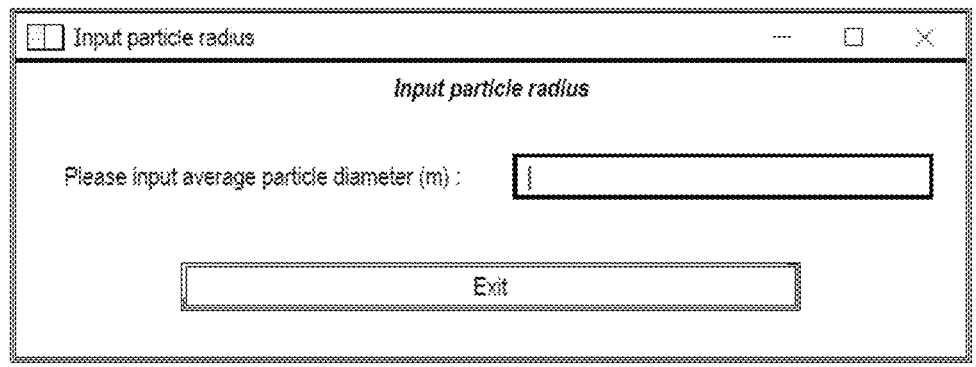
FIG. 6 is a GUI for inputting the "Uniform size: user input" option for specifying the average asphaltene particle diameter.

FIG. 6 is a GUI for inputting the "uniform size: user input" option for specifying the average asphaltene particle diameter. The system offers four average particle size, or diameter, determination options. By choosing the "Uniform size: default" option, the default asphaltene particle size of 10 μm will be assigned. By choosing the "Uniform size: user input" option, the user can specify the average asphaltene particle diameter by input in the following sub-window as shown in FIG. 6. The user can upload the particle size distribution, too. By choosing the "Size distribution: default" and "Size distribution: user input" options, the user can specify the particle diameter and weight percentage. The uploaded file may be organized in ".txt" form with two columns, as exemplified in FIG. 7.

P-T Thermo-Dynamical Model Sub-Window

Figure 7:
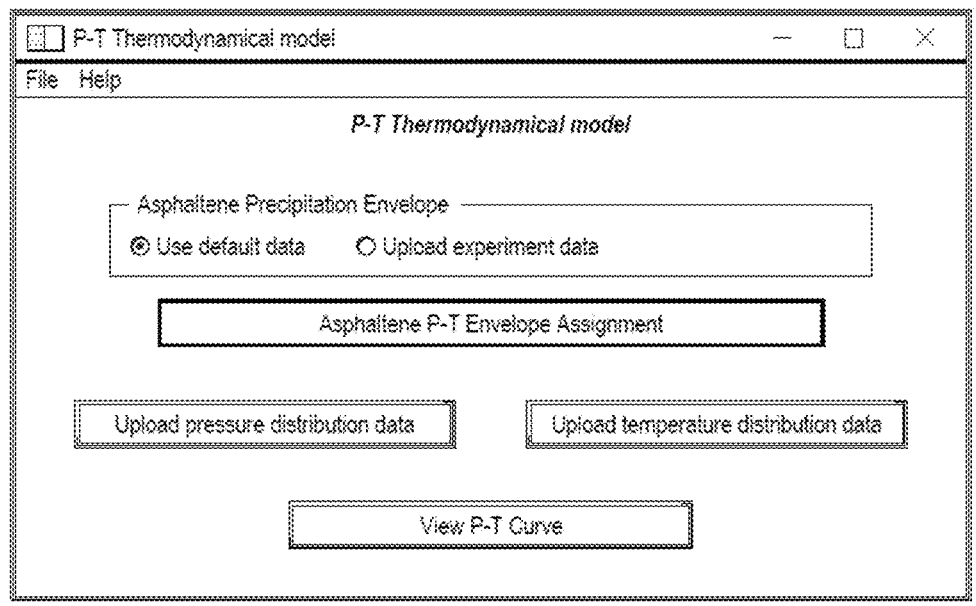
FIG. 7 is a GUI for entering P-T thermo-dynamical data.
Figure 8:
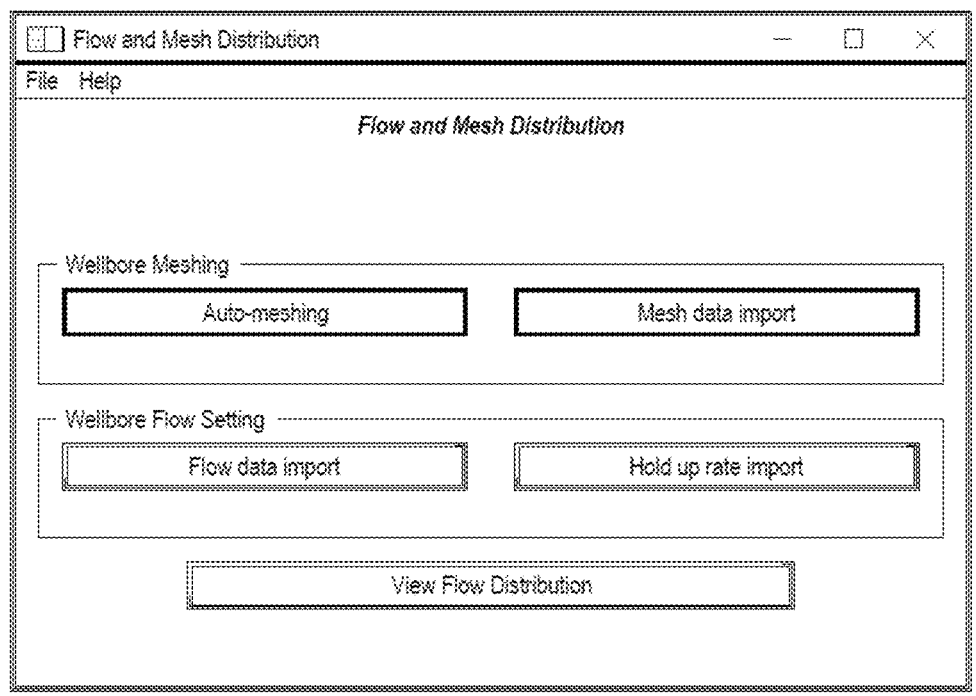
FIG. 8 is a GUI for specifying the flow and mesh distribution data of the wellbore.

FIG. 7 is a GUI for entering P-T thermo-dynamical data. In the P-T thermo-dynamical model, the user can upload the APE, wellbore pressure, and temperature distribution data. The default APE and bubble point curve integrated into the system is described in H. Lei et al., "Experimental Investigation and Application of the Asphaltene Precipitation Envelope," Energy & Fuels, 2015, which is incorporated by reference. The user can upload the experimental APE and bubble point data by choosing the "Upload experiment data" option and clicking "Asphaltene P-T envelope assignment" button as shown in FIG. 8. The uploaded file of the upper and lower boundary of APE and bubble point pressure may be organized in ".txt" form with two columns. The uploaded temperature and pressure data may be a one-column ".txt" file. The unit of temperature may be ° C., and the pressure unit may be MPa. The row number is equal to the total mesh number.

Flow and Mesh Distribution Sub-Window

FIG. 8 is a GUI for specifying the flow and mesh distribution data of the wellbore. In the "Wellbore Meshing" section, two options are offered to the user to specify mesh distribution: "Auto meshing" and "Mesh data import." The Auto meshing button is described below. The user can organize and upload the data file of wellbore mesh distribution by clicking the "Mesh data import" button. The uploaded file of wellbore mesh data may be organized in ".txt" form with two columns. The user can obtain the wellbore flow data from other wellbore flow simulators. The uploaded wellbore velocity and holdup data may both be organized in ".txt" form with a single column. The data should be ordered according to the wellbore mesh number.

Auto Meshing Sub-Window

Figure 9:
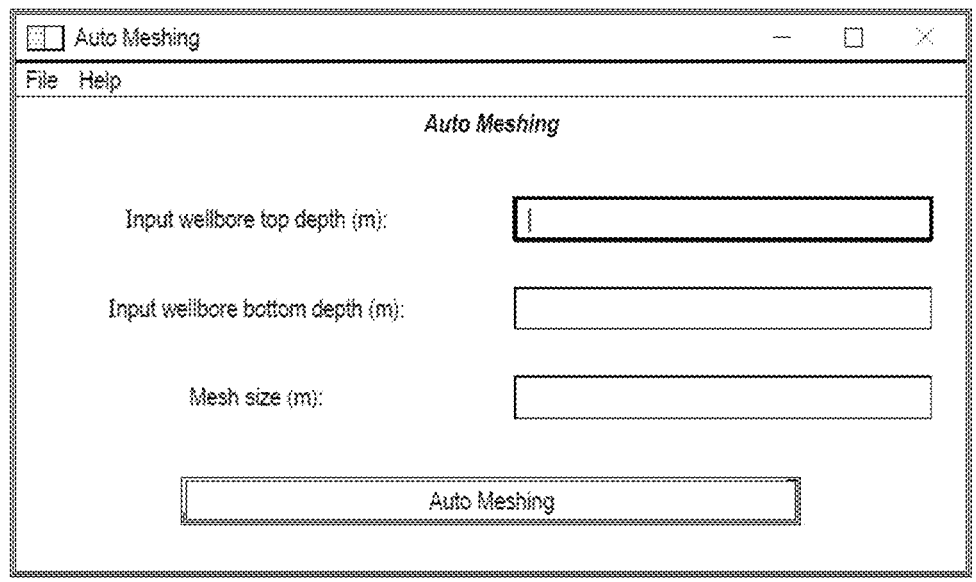
FIG. 9 is a GUI window for auto-generated wellbore mesh data that will be assigned after the user specifies data for wellbore top depth, wellbore bottom depth, and mesh size.

FIG. 9 is a GUI window for auto-generated wellbore mesh data that will be assigned after the user specifies data for wellbore top depth, wellbore bottom depth, and mesh size. By clicking the "Auto meshing" button, auto-generated wellbore mesh data will be assigned after the user specifies the wellbore top depth, and the wellbore bottom depth, and the mesh size. It is noticeable that the mesh generated by this method is equal-sized.

Calculating Parameter Input Sub-Window

Figure 10:
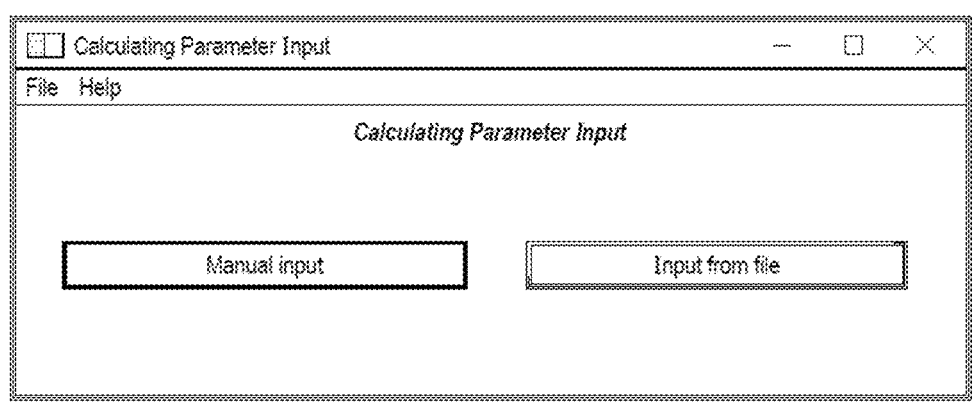
FIG. 10 is a GUI for inputting other modeling parameters by manual input or by input from a file.
Figure 11:
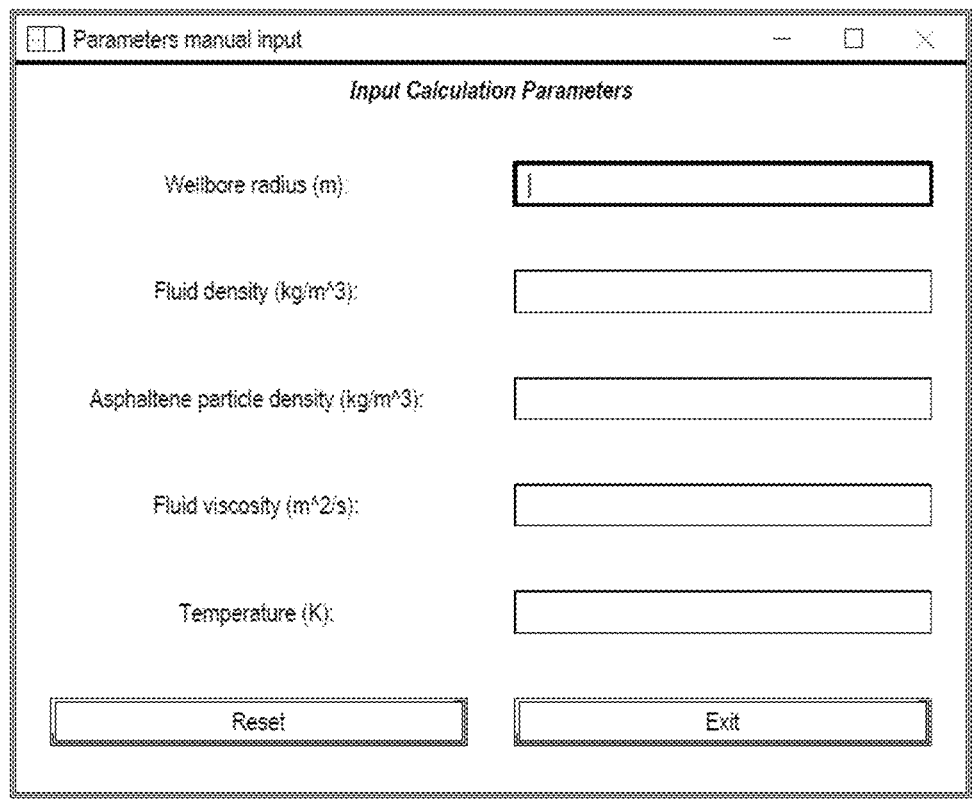
FIG. 11 is a GUI for inputting calculation parameters manually.
Figure 12:
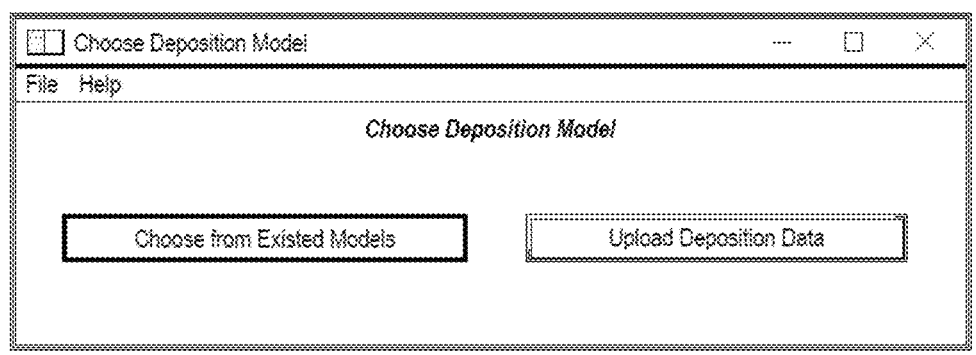
FIG. 12 is a GUI for choosing a deposition model.

FIG. 10 is a GUI for inputting other modeling parameters by manual input or by input from a file. FIG. 11 is a GUI for inputting calculation parameters manually. FIG. 11 results from clicking on the "Manual input" button in the GUI in FIG. 10. FIG. 12 is a GUI for choosing a deposition model. FIG. 12 results from clicking on the "Input from file" button in the GUI in FIG. 10. The user can also upload an organized single-column ".txt" file to specify those parameters.

2. Model Setting Module

Choosing a Deposition Model

FIG. 12 is a GUI for choosing a deposition model. The user can determine the model for determining the particle deposition velocity. The user can choose from various deposition models. Specific models from which a deposition model can be selected are shown below in Table 1 and are described and graphically represented in FIG. 9 of Amir A. Mofakham, et al., "Particles dispersion and deposition in inhomogeneous turbulent flows using continuous random walk models," Physics of Fluids, 2019, which is incorporated by reference.

TABLE 1

| Deposition Models |
| --- |
| Chen and McLaughlin (1995) |
| Conventional-CRW |
| Fan and Ahmadi (1993) Eqn. 19 |

TABLE 1-continued

| Deposition Models |
| --- |
| He and Ahmadi (1999) |
| Li and Ahmadi (1993) |
| McLaughlin (1989) |
| Marchioli et al. (2007) |
| Nonnormalized-CRW |
| Normalized-CRW |
| Normalized-CRW (w/o Eq. 1) |
| Normalized-CRW (w/o BL) |
| Papavergos and Hedley (1984) |
| Tian and Ahmadi (2007) |
| Wood (1981) Eqn. 20 |
| Zhang and Ahmadi (2000) |

3. Aggregation Model

Figure 13:
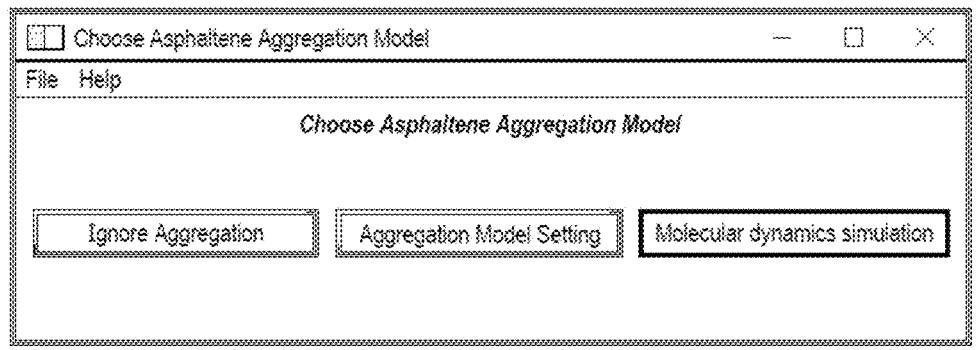
FIG. 13 is a GUI for choosing an asphaltene aggregation model.

FIG. 13 is a GUI for choosing an asphaltene aggregation model. If the aggregation parameters are insufficient or the calculation does not need to consider the asphaltene aggregation, the user can click the "Ignore aggregation" button. The integrated asphaltene aggregation model may be from Nazmul H. G. Rahmani, et al., "Characterization of Asphaltenes Aggregation and Fragmentation in a Shear Field," AIChE Journal, 2003 ("Rahmani"), which is incorporated by reference.

Figure 14:
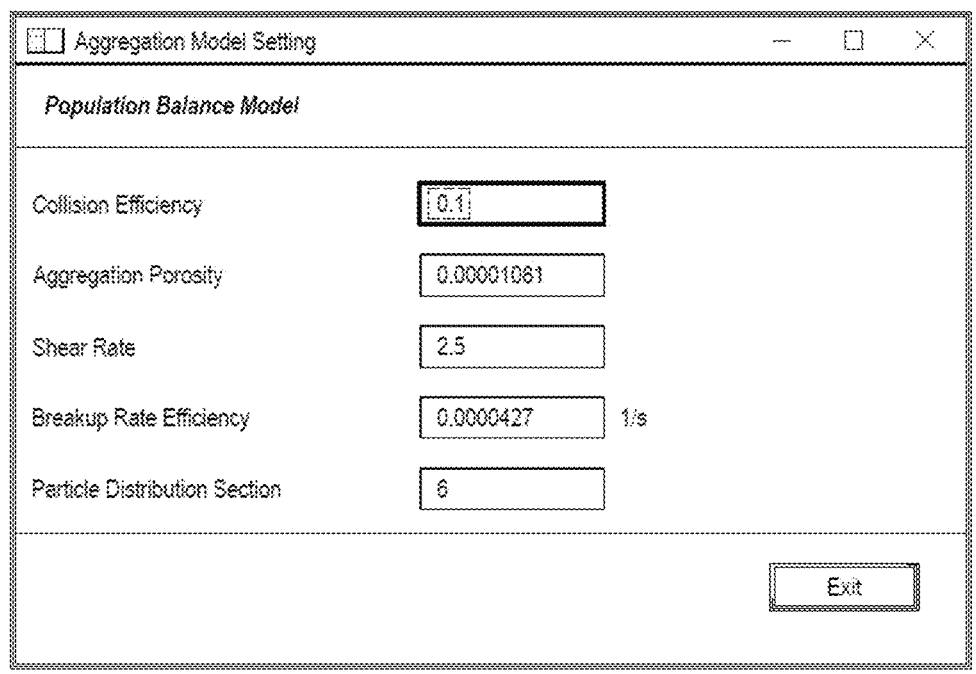
FIG. 14 is a GUI for inputting parameters for a population balance model.

FIG. 14 is a GUI for inputting parameters for a population balance model. FIG. 14 results from clicking on the "Aggregation Model Setting" button in the GUI of FIG. 13.

Figure 15:
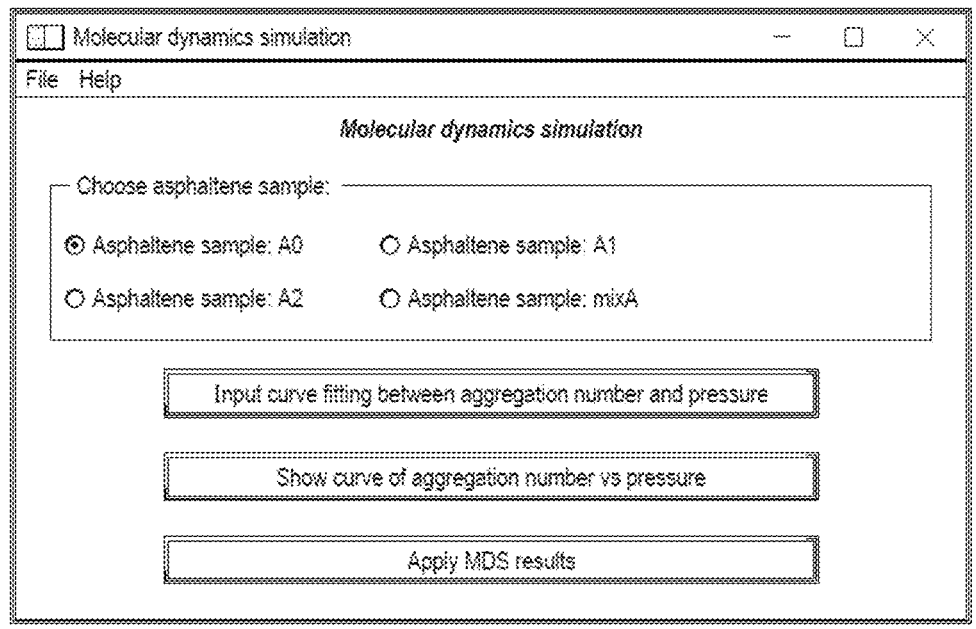
FIG. 15 is a GUI for running a molecular dynamics simulation.

FIG. 15 is a GUI for running a molecular dynamics simulation. FIG. 15 results from clicking on the "Molecular dynamics simulation" button in the GUI in FIG. 13. Results from simulations of four asphaltene samples have already been integrated into the system.

Figure 16:
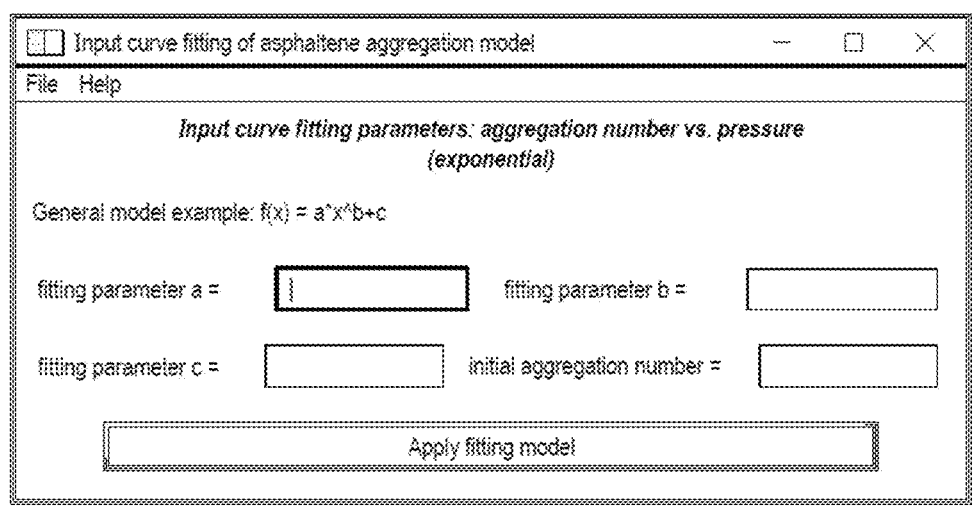
FIG. 16 is a GUI for inputting curve fitting parameters.

FIG. 16 is a GUI for inputting curve fitting parameters. FIG. 16 results from clicking on the "Input curve fitting between aggregation number and pressure" button in the GUI in FIG. 15. Except for the given samples, the user can define the correlation between aggregation number and pressure by specifying the fitting curve. The fitting model offered by the system is an exponential model, and the user may specify fitting parameter a, fitting parameter b, fitting parameter c, and the initial aggregation number. After selecting an asphaltene simple or input fitting parameters, the curve of aggregation number versus pressure can be observed by clicking the "Show cure" button, and the MDS data can be applied in the following calculation by clicking the "Save and Exit" button.

Figure 17:
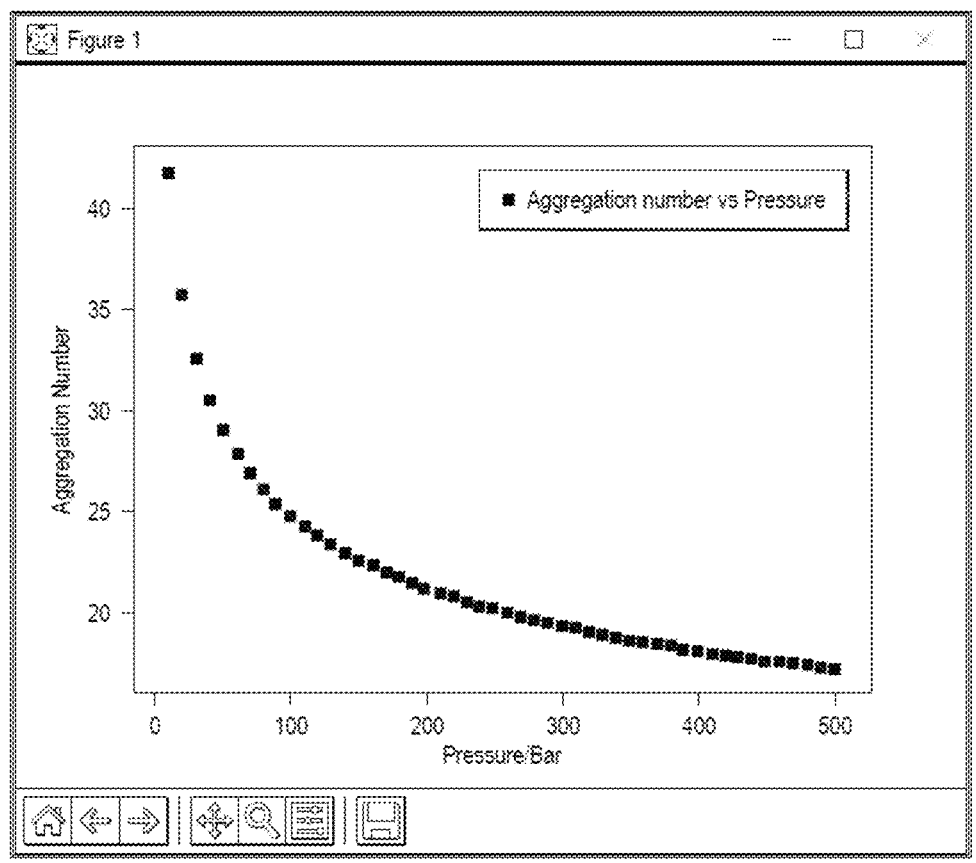
FIG. 17 is a graph of a curve of aggregation number versus pressure produced from the curve fitting parameters inputted in FIG. 16.

FIG. 17 is a graph of a curve of aggregation number versus pressure produced from the curve fitting parameters inputted in FIG. 16. The x-axis represents pressure in bars, and the y-axis represents aggregation number in constant units.

4. Calculation Module

Calculation Configuration

Figure 18:
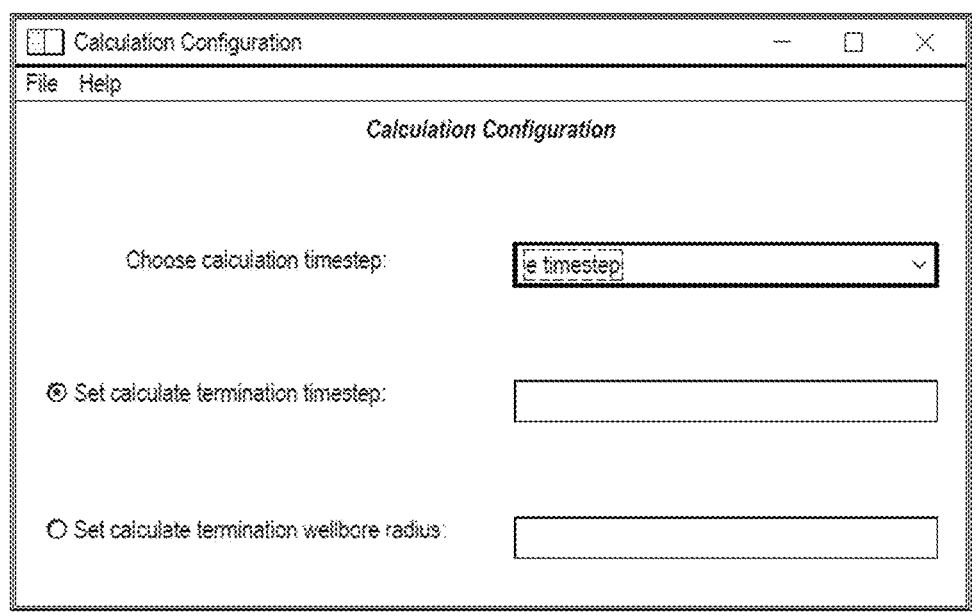
FIG. 18 is a GUI for inputting a calculation configuration.

FIG. 18 is a GUI for inputting a calculation configuration. The user can specify the timestep and terminal condition of the calculation. By selecting the given options in the drop-down menu, the user can choose the desired timestep. The user can specify the termination condition by either defining the calculation time step number or the critical wellbore radius ratio. The user may select one of these options first and then input the termination condition.

Start Calculation

In the next step, the user starts the calculation. The calculating timestep will update in the text box during the calculation process.

5. Post-Processing Module

Plot Figure

Figure 19:
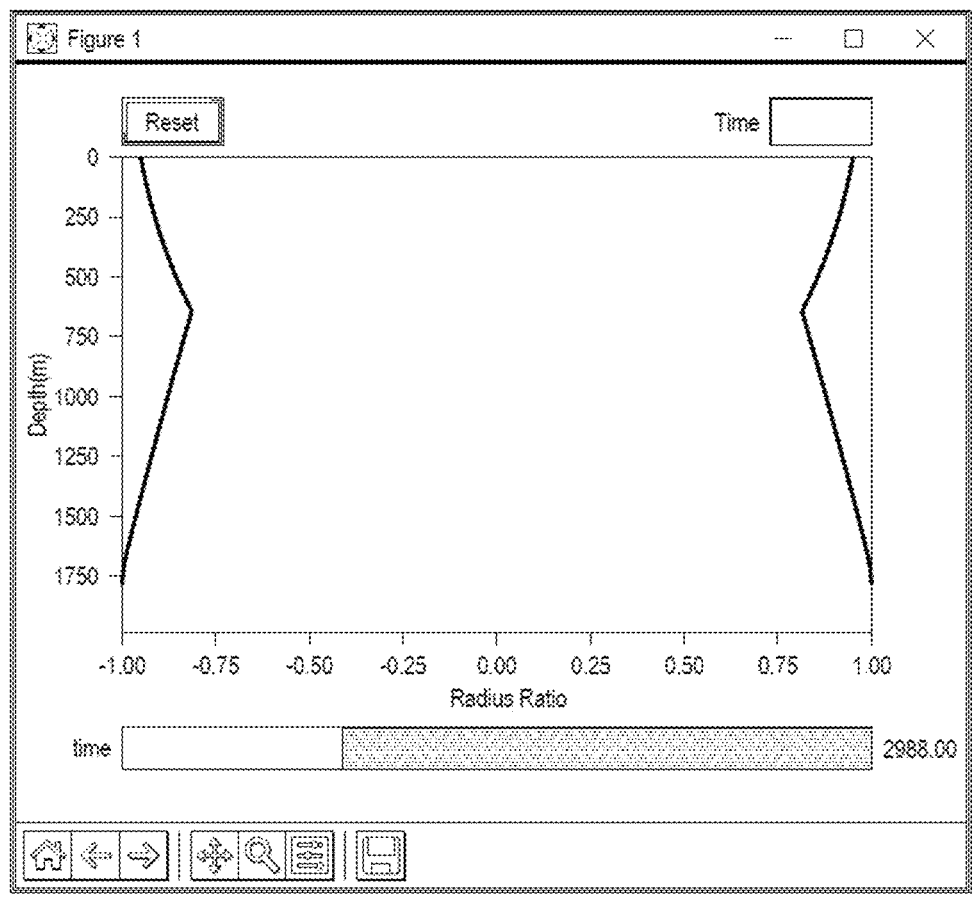
FIG. 19 is a graph of a wellbore blockage profile obtained once the calculation step is completed.

FIG. 19 is a graph of a wellbore blockage profile obtained once the calculation step is completed. The wellbore blockage profile can be imaged by clicking the "Plot Figure" button. The user can drag the bar under the figure to adjust the results of timestep that are shown, and the user can also specify the displayed timestep by inputting it in the top-right textbox. The toolbar below the blockage profile can be used to achieve various functions. Specifically, the home button resets to the original view, the left arrow button moves back to the previous view, the right arrow button moves forward to the next view, the cross button pans the axes with a left mouse click and zooms with a right mouse click, the magnifying glass button enables a zoom rectangle, the horizontal lines button configures subplots, and the disk button saves the figure.

Save Data

Figure 20:
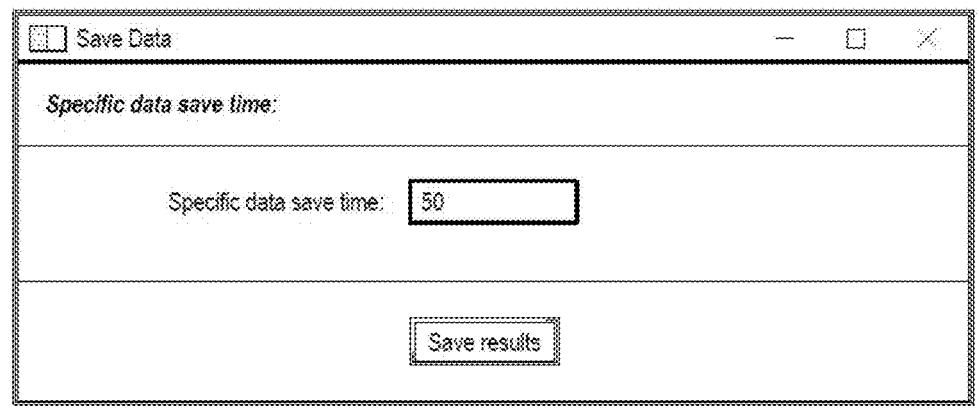
FIG. 20 is a GUI which for enabling the user to save the wellbore blockage data for a specific data save time.

FIG. 20 is a GUI which for enabling the user to save the wellbore blockage data for a specific data save time. After calculation, the user can save the wellbore blockage data for further use. After the user specifies the timestep of the data that he or she wants to save, the user clicks the "Save results" button.

Figure 21:
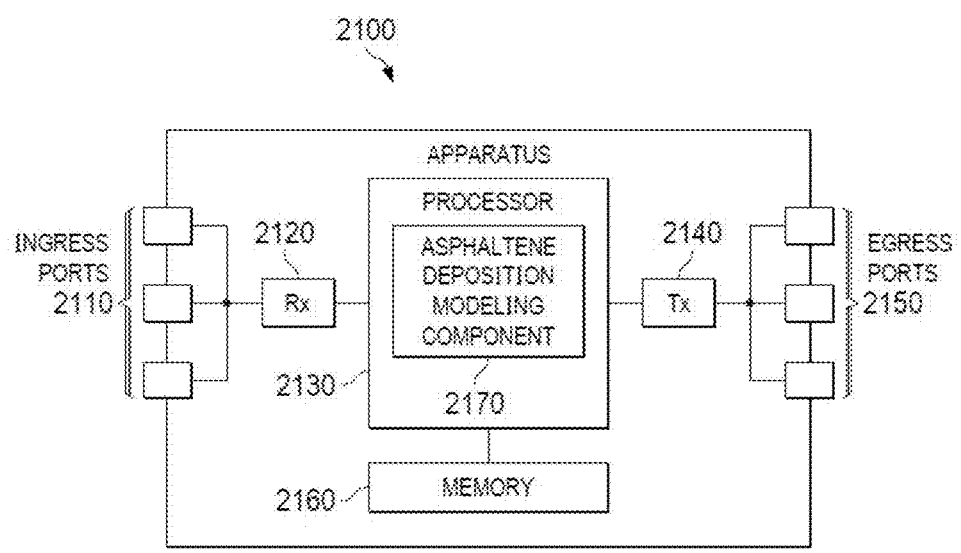
FIG. 21 is a schematic diagram of an apparatus according to an embodiment of the disclosure.

FIG. 21 is a schematic diagram of an apparatus 2100 according to an embodiment of the disclosure. The apparatus 2100 may implement the disclosed embodiments. The apparatus 2100 comprises ingress ports 2110 and an RX 2120 to receive data; a processor 2130, or logic unit, baseband unit, or CPU, to process the data; a TX 2140 and egress ports 2150 to transmit the data; and a memory 2160 to store the data. The apparatus 2100 may also comprise OE components, EO components, or RF components coupled to the ingress ports 2110, the RX 2120, the TX 2140, and the egress ports 2150 to provide ingress or egress of optical signals, electrical signals, or RF signals.

The processor 2130 is any combination of hardware, middleware, firmware, or software. The processor 2130 comprises any combination of one or more CPU chips, cores, FPGAs, ASICs, or DSPs. The processor 2130 communicates with the ingress ports 2110, the RX 2120, the TX 2140, the egress ports 2150, and the memory 2160. The processor 2130 comprises an asphaltene deposition modelling component 2170, which implements the disclosed embodiments. The inclusion of the asphaltene deposition modelling component 2170 therefore provides a substantial improvement to the functionality of the apparatus 2100 and effects a transformation of the apparatus 2100 to a different state. Alternatively, the memory 2160 stores the asphaltene deposition modelling component 2170 as instructions, and the processor 2130 executes those instructions.

The memory 2160 comprises any combination of disks, tape drives, or solid-state drives. The apparatus 2100 may use the memory 2160 as an over-flow data storage device to store programs when the apparatus 2100 selects those programs for execution and to store instructions and data that the apparatus 2100 reads during execution of those programs. The memory 2160 may be volatile or non-volatile and may be any combination of ROM, RAM, TCAM, or SRAM.

A computer program product may comprise computer-executable instructions for storage on a non-transitory medium and that, when executed by a processor, cause an apparatus to perform any of the embodiments. The non-transitory medium may be the memory 2160, the processor may be the processor 2130, and the apparatus may be the apparatus 2100.

Figure 22:
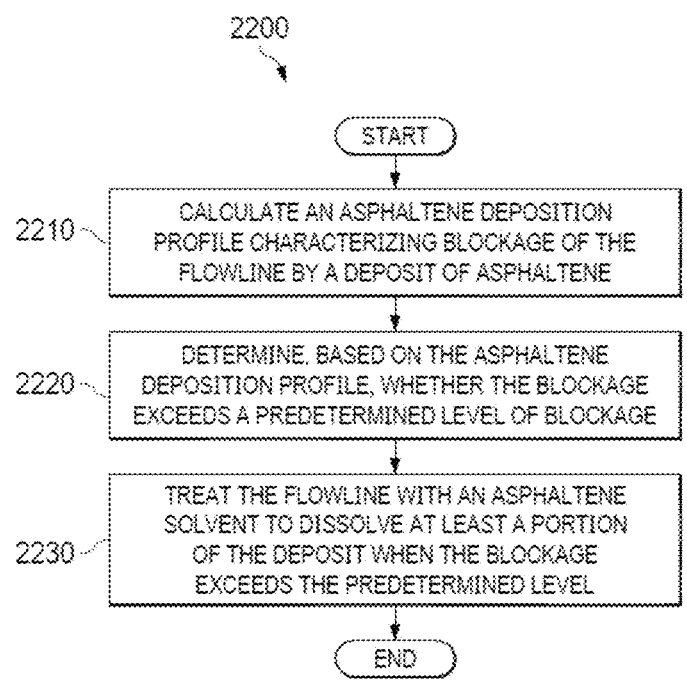
FIG. 22 is a flowchart illustrating a method of performing a remediation process on a flowline.

FIG. 22 is a flowchart illustrating a method 2200 of performing a remediation process on a flowline. At step 2210, an asphaltene deposition profile characterizing blockage of the flowline by a deposit of asphaltene is calculated. The detailed calculation steps of this algorithm are as follows:

Step 1: Read the data uploaded by the user, which include asphaltene content, asphaltene particle size distribution, upper and lower boundaries of asphaltene precipitation envelope, bubble point pressure, pressure distribution along the wellbore, pressure and temperature distribution of the wellbore, flow velocity along the wellbore, and other modelling parameters.

Step 2: Divide the wellbore length into a series of simulation grids/elements. The grid size and grid number are user-defined and can be determined by the user. More grid blocks may be preferred for accuracy of the results, but simulations will become computationally more expensive.

Step 3: Determine the asphaltene precipitation amount within each grid/element, given asphaltene precipitation envelop, wellbore P-T distribution, and the bubble point pressure provided in Step 1. Considering the well-documented fact that the maximum asphaltene precipitation occurs at the bubble point at any given temperature and no precipitation occurs beyond the upper and lower bonds, a linear approximation is being used to determine equilibrium precipitation amount at any simulation grid along the wellbore (defined in Step 2) using the asphaltene precipitation envelope (provided in Step 1). The linear approximation is such that the maximum precipitation will be realized at the bubble point at any given temperature along the wellbore and as pressure increases toward the upper boundary or decreases toward the lower boundary in the precipitation envelope and as the precipitation amount decreases until no precipitation is to be realized beyond the boundaries. Within each simulation grid during the given time step, the temperature will be set based on the temperature profile provided in Step 1. Next, using the pressure value obtained from the pressure profile (in Step 1) for that simulation grid block, if the pressure value falls within the range of the upper and lower boundaries in the precipitation envelope for that grid temperature, then a linear approximation will be used to determine equilibrium precipitation amount for that grid block.

Step 4: Calculate the asphaltene deposition rate for each particle size (equivalently, corresponding relaxation time) using the flow velocity profile and particle size distribution function via selecting one of the embedded models in the algorithm (Table 1). Next, calculate net deposition amount during the time step (multiplying the deposition rate by time) for each particle size and add them up to find the total deposition amount within each simulation grid during the given time step. Next, convert the deposition volume within each grid into local relative well blockage through dividing the deposited volume by the original grid volume. Deposition volume is cumulative and will be added to the total deposition realized in the previous time steps for that grid block.

Step 5: Take the aggregation behavior of the asphaltene particles into consideration at the end of each time step within each simulation grid. Using the algorithm detailed in the aggregation model of section 3, renew the asphaltene particle size distribution by solving the particle balance equation and update the asphaltene particle size distribution for utilization in the next time steps. The particle balance equation may be equation (1) in Rahmani.

Step 6: Update the flow field along the wellbore with the new wellbore radius profile every time the wellbore radius significantly decreases due to deposition. The size of this significant reduction in wellbore radius is arbitrary and can be adjusted by the user. When the wellbore radius relatively decreases 5% due to collective depositions realized in the past, an updated flow profile along the wellbore may be called from the wellbore flow simulator to replace the previous profile in Step 1 before continuing to the next time step.

At step 2220, it is determined, based on the asphaltene deposition profile, whether the blockage exceeds a predetermined level of blockage. At step 2230, the flowline is treated with an asphaltene solvent to dissolve at least a portion of the deposit when the blockage exceeds the predetermined level.

The method 2200 may comprise additional embodiments. For instance, calculating the asphaltene deposition profile comprises uploading modelling parameters of the asphaltene in oil and of the flowline, using an asphaltene precipitation model or reading user-defined data to determine a weight percentage of precipitated asphaltene particles in the oil, utilizing asphaltene particle size distribution data of the oil in an asphaltene aggregation model to obtain an asphaltene aggregation value, using an asphaltene deposition model to calculate an asphaltene deposition rate, and obtaining the asphaltene deposition profile using the asphaltene deposition rate. The modelling parameters comprise an asphaltene particle size distribution a flowline mesh, a flowline velocity distribution profile, a flowline pressure, a flowline temperature distribution, an asphaltene precipitation envelope, and an asphaltene bubble point pressure.

What is claimed is:

1. A method of performing a remediation process on a flowline, the method comprising:
    calculating, using one or more processors, an asphaltene deposition profile characterizing blockage of the flowline by a deposit of asphaltene, wherein calculating the asphaltene deposition profile comprises reading user-defined data to determine a weight percentage of precipitated asphaltene particles in oil;
    determining, based on the asphaltene deposition profile, whether the blockage exceeds a predetermined level of blockage; and
    treating the flowline with an asphaltene solvent to dissolve at least a portion of the deposit when the blockage exceeds the predetermined level.

2. The method of claim 1, wherein calculating the asphaltene deposition profile further comprises uploading modelling parameters of the asphaltene in the oil and of the flowline.

3. The method of claim 1, wherein calculating the asphaltene deposition profile further comprises utilizing asphaltene particle size distribution data of the oil in an asphaltene aggregation model to obtain an asphaltene aggregation value.

4. The method of claim 3, wherein calculating the asphaltene deposition profile further comprises using an asphaltene deposition model to calculate an asphaltene deposition rate.

5. The method of claim 4, wherein calculating the asphaltene deposition profile further comprises obtaining the asphaltene deposition profile using the asphaltene deposition rate.

6. The method of claim 2, wherein the modelling parameters comprise an asphaltene particle size distribution.

7. The method of claim 2, wherein the modelling parameters comprise a flowline mesh.

8. The method of claim 2, wherein the modelling parameters comprise a flowline velocity distribution profile.

9. The method of claim 2, wherein the modelling parameters comprise a flowline pressure.

10. The method of claim 2, wherein the modelling parameters comprise a flowline temperature distribution.

11. The method of claim 2, wherein the modelling parameters comprise an asphaltene precipitation envelope.

12. The method of claim 2, wherein the modelling parameters comprise an asphaltene bubble point pressure.

13. A computer program product comprising instructions that are stored on a computer-readable medium and that, when executed by one or more processors, cause an apparatus to:
    calculate an asphaltene deposition profile characterizing blockage of a flowline by a deposit of asphaltene by reading user-defined data to determine a weight percentage of precipitated asphaltene particles in oil;
    determine, based on the asphaltene deposition profile, whether the blockage exceeds a predetermined level of blockage; and
    determine to treat the flowline with an asphaltene solvent to dissolve at least a portion of the deposit when the blockage exceeds the predetermined level.

14. The computer program product of claim 13, wherein the instructions, when executed by the one or more processors, further cause the apparatus to calculate the asphaltene deposition profile by uploading modelling parameters of the asphaltene in the oil and of the flowline.

15. The computer program product of claim 13, wherein the instructions, when executed by the one or more processors, further cause the apparatus to calculate the asphaltene deposition profile by utilizing asphaltene particle size distribution data of the oil in an asphaltene aggregation model to obtain an asphaltene aggregation value.

16. The computer program product of claim 15, wherein the instructions, when executed by the one or more processors, further cause the apparatus to calculate the asphaltene deposition profile by:
    using an asphaltene deposition model to calculate an asphaltene deposition rate; and
    obtaining the asphaltene deposition profile using the asphaltene deposition rate.

17. The computer program product of claim 14, wherein the modelling parameters comprise an asphaltene particle size distribution a flowline mesh, a flowline velocity distribution profile, a flowline pressure, a flowline temperature distribution, an asphaltene precipitation envelope, and an asphaltene bubble point pressure.

18. An apparatus comprising:
    a memory configured to store instructions; and
    one or more processors coupled to the memory and configured to execute the instructions to cause the apparatus to:
        calculate an asphaltene deposition profile characterizing blockage of a flowline by a deposit of asphaltene by reading user-defined data to determine a weight percentage of precipitated asphaltene particles in oil;
        determine, based on the asphaltene deposition profile, whether the blockage exceeds a predetermined level of blockage; and
        determine to treat the flowline with an asphaltene solvent to dissolve at least a portion of the deposit when the blockage exceeds the predetermined level.

19. The apparatus of claim 18, wherein the one or more processors are further configured to execute the instructions to calculate the asphaltene deposition profile by:
   uploading modelling parameters of the asphaltene in the oil and of the flowline;
   utilizing asphaltene particle size distribution data of the oil in an asphaltene aggregation model to obtain an asphaltene aggregation value;
   using an asphaltene deposition model to calculate an asphaltene deposition rate; and
   obtaining the asphaltene deposition profile using the asphaltene deposition rate.

20. The apparatus of claim 19, wherein the modelling parameters comprise an asphaltene particle size distribution a flowline mesh, a flowline velocity distribution profile, a flowline pressure, a flowline temperature distribution, an asphaltene precipitation envelope, and an asphaltene bubble point pressure.

* * * * *